United States Patent [19]
Volk, Jr.

[11] Patent Number: 4,935,874
[45] Date of Patent: Jun. 19, 1990

[54] METHOD AND APPARATUS FOR CONTROLLING STEAM IN A PELLET MILL

[75] Inventor: Joseph A. Volk, Jr., Creve Coeur, Mo.

[73] Assignee: Beta Raven Inc., Earth City, Mo.

[21] Appl. No.: 148,564

[22] Filed: Jan. 26, 1988

[51] Int. Cl.⁵ .................... G06F 15/20; F23N 1/00
[52] U.S. Cl. .................... 364/468; 364/494; 122/448 R
[58] Field of Search ........... 364/494, 105, 103, 468; 236/26 R, 78 R, 24.5, 25 R, 24 R; 122/448 R, 451.2, 446, 7 R, 1 R, 448 S, 7 B, 240 R, 479 B

[56] References Cited

U.S. PATENT DOCUMENTS

| | | | |
|---|---|---|---|
| 3,236,449 | 2/1966 | Brunner | 122/448 R |
| 3,942,483 | 3/1976 | Lasudli | 122/451 S |
| 4,074,360 | 2/1978 | Stadie | 122/448 R |
| 4,136,643 | 1/1979 | Aguet | 122/240 R |
| 4,184,324 | 1/1980 | Kiscaden | 364/494 |
| 4,211,071 | 7/1980 | Wyatt . | |
| 4,288,978 | 9/1981 | Wyatt . | |
| 4,337,619 | 7/1982 | Wyatt . | |
| 4,418,651 | 12/1983 | Wyatt . | |
| 4,441,460 | 4/1984 | Wyatt . | |
| 4,572,110 | 2/1986 | Haeflich | 122/448 B |
| 4,593,654 | 6/1986 | McInerney | 122/448 R |
| 4,700,310 | 10/1987 | Volk, Jr. . | |
| 4,787,554 | 11/1988 | Bantels | 122/448 R |

*Primary Examiner*—Michael R. Fleming
*Attorney, Agent, or Firm*—Rogers, Howell & Haferkamp

[57] ABSTRACT

A control for a vapor steam generator as used with a pellet mill senses the exhaust temperature of the steam and controls it by modulating the flow of air/gas to the burner independently of the flow rate of moisture such that steam having a constant moisture content can be produced at varying temperatures. The constant moisture content steam is desirably used in the pellet mill by ratioing the flow of moisture to the flow of dry material such that finished pellets having a pre-determined moisture content can be reliably produced.

14 Claims, 1 Drawing Sheet

U.S. Patent
Jun. 19, 1990
4,935,874
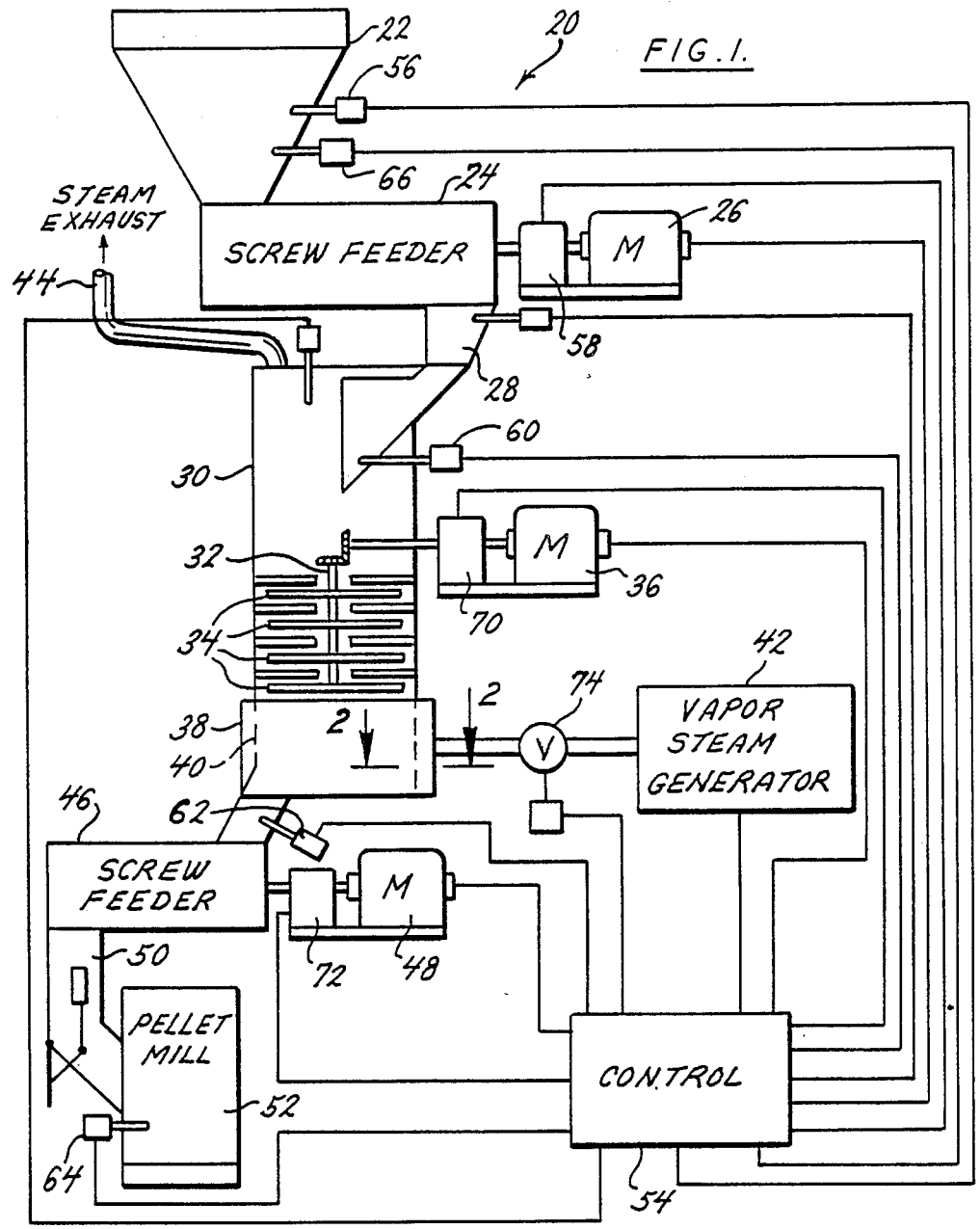
FIG. 1.
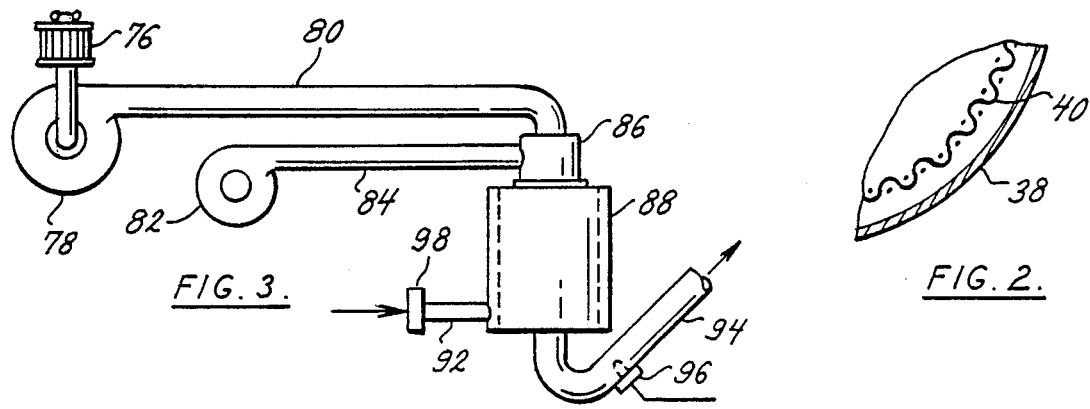
FIG. 3.
FIG. 2.

METHOD AND APPARATUS FOR CONTROLLING STEAM IN A PELLET MILL

BACKGROUND AND SUMMARY OF THE INVENTION

The inventor herein has previously designed and developed automatic controls for pellet mills which automatically control the process of converting dry material and various kinds of moisture including steam, water and molasses or the like into pellets of homogeneous composition as is desired in the feed and other industries. These automatic pellet mill controllers are disclosed and claimed in his prior patents including U.S. Pat. Nos. 3,932,736; 4,340,937; 4,463,430; and 4,700,310, the disclosures of which are incorporated herein by reference. Of particular significance with regard to the present invention disclosed and claimed herein is the '310 patent which discloses the use of a vapor steam generator which can convert water to steam on a continuous flow basis, producing superheated steam at a constant pressure of between 4-6 psi and an adjustable temperature between 194° F.-600° F. The operation of the vapor steam generator is more fully and completely disclosed in Pat. Nos. 4,211,071; 4,288,978; 4,337,619; 4,418,651; and 4,441,460, while its use in connection with a pellet mill is disclosed more particularly in the '310 patent mentioned above. Although reference should be made to these prior patents, the operation of the vapor steam generator, as understood by the inventor, generally has been to burn an air/gas mixture in a burner which is surrounded by water, the temperature of the exhaust steam being sensed downstream from the burner for use in modulating the flow of water through the combustion chamber to achieve a specific temperature. In other words, after an initial start-up of relatively short duration, the burner is operated at full capacity and the flow of water through the burner chamber is used to control the output temperature of the steam.

While in some processes it may be desirable for the output of a vapor steam generator to have a varying moisture content, in a pellet mill application it is highly desirable to control the moisture content of the steam more directly as one of the ultimate goals of a pellet mill is to produce pellets having a pre-determined moisture content. Such a pre-determined moisture content in a finished pellet may be more readily attained by controlling the rate of input of the dry material as well as the specific amount of moisture as the pellet mill operates. Of course, the pelleting process is a continuous process and not a batch process in that dry material and moisture are constantly being fed into the pellet mill. As explained in the inventor's prior patents, the pelleting process is not a simple one and there has been much effort expended to find ways to optimize the throughput capacity of the pellet mill while ensuring the production of satisfactory pellets having a desired moisture content. The vapor steam generator mode of controlling temperature by varying the water flow is not as desirable as it could be in that with its present control mode, there is a tendency for the vapor steam generator to produce steam having a varying moisture content.

To solve these and other problems in the prior art, and to more readily adapt the vapor steam generator for use in a pelleting process, the inventor herein has succeeded in developing a control mode for the vapor steam generator which permits it to generate a continuous flow of steam at a preselected moisture content, and yet provide temperature control of the steam produced by the vapor generator as is desired to control the temperature in the pellet mill. In simple terms, this mode of control comprises modulating the flow of the air/gas mixture to the burner while maintaining a relatively constant water flow through the combustion chamber. As in the previous control mode, the temperature of the exhaust steam output may be sensed shortly downstream from the combustion chamber. However, instead of using the water flow as the control parameter, the flow of air/gas to the burner may be used to increase or decrease the amount of heat generated and thereby change the temperature of the steam generated without changing the rate of flow of moisture. In its simplest form, the moisture may simply be ratioed as a percentage of the rate of flow of dry material which, after compensation for various losses due to boil off, etc. should result in finished pellets having the desired pre-determined moisture content.

Having satisfied the moisture content to be achieved in the final, finished pellets, the temperature range at which the pellet mill may operate could variably be chosen to optimize other parameters in the mill, such as pellet durability. For example, as the temperature in the pellet mill goes up, the friction in the die goes up which results in greater compaction of material in the pelleting process which results in a more compacted pellet having improved durability. Furthermore, higher temperatures may also increase the "cooking" effect which is desirably achieved in certain formulations to kill germs such as salmonella and other types of microorganisms. It has also been reported that higher temperatures add to the digestability of the finished pellet as the heat serves to break down the complex carbohydrates and other compounds contained in the feed. Still another consideration which is temperature dependent is the wear on the die. Absent these other considerations, it may be more desirable in some formulations to operate at lower temperatures which reduces die friction and helps to extend the operating life of the die.

In summary, it is believed that the present invention more completely adapts the vapor steam generator for use in the pelleting process by fixing the moisture rate while optimizing the steam temperature to suit the more important considerations inherent in the pelleting process and pellet mill. While the principal advantages and features of the present invention have been briefly described, a greater understanding thereof may be gained by referring to the drawings and description of the preferred embodiment which follow.

BRIEF DESCRIPTION OF THE DRAWINGS

FIG. 1 is a schematic diagram of a pellet mill and vapor steam generator along with a control interconnected between them;

FIG. 2 is a partial cross-sectional view taken along the plane of line 2—2 in FIG. 1 detailing the jacketed screen wall for introducing steam into the conditioner; and FIG. 3 is a schematic diagram of the vapor steam generator in greater detail.

DETAILED DESCRIPTION OF THE PREFERRED EMBODIMENT

As shown in FIG. 1, a typical pellet mill 20 includes an input bin for dry feed 22 which feeds dry material through a screw feeder 24 driven by motor 26 through a chute or spout 28 into a vertical conditioner 30, vertical conditioner 30 having a vertically mounted drive shaft 32 with paddles 34 as driven by drive motor 36. A mixing enclosure 38 surrounds the lower end of vertical conditioner 30 and has a screen 40 (as best shown in FIG. 2) separating the feed from an annular space into which steam is introduced from the vapor steam generator 42. As can be appreciated, once steam from steam generator 42 is introduced into mixing chamber 38 it mixes with material and rises through the vertical conditioner 30, with excess steam exiting steam exhaust 44. Another screw feeder 46 is driven by motor 48 to transport the mixture of mash from the vertical conditioner through chute 50 into the pellet mill 52.

The pellet mill controller 54 has connections to a bin temperature sensor 56, a temperature sensor 58 which senses the temperature of the material prior to its entering vertical conditioner 30, temperature sensor 62 which senses the temperature of the mash mixture after exiting the vertical conditioner 30, and temperature sensor 64 which can be positioned to sense the temperature of the material after it is pelleted, or to sense the temperature of the die (not shown), or the pellets as they are immediately formed by the die. For purposes of clarity, only a single temperature sensor 64 is shown. However, it is to be understood that a temperature sensor can be positioned as desired to sense the temperature of any of the above. In addition to temperature sensors, the control 54 has a bin level sensor 66 which senses the level of material in the bin 22, and feedback signals from tachometers 68, 70, and 72 to sense the speed of the various motors positioned throughout the mill 20, all as known in the art. Steam flow can be controlled through a valve 74, and the variable temperature of the steam can be controlled by controlling the vapor steam generator 42.

The vapor steam generator 42 is shown in greater detail in FIG. 3, which is a diagrammatic view of the vapor steam generator similar to that shown in U.S. Pat. No. 4,211,071, the disclosure of which is incorporated herein by reference. Although its operation is explained in greater detail in the referenced patent, devices presently being used operate somewhat differently. The operation explained herein corresponds to that as best known to the inventor for devices he has observed in this field. Air is drawn in through an air filter 76 to a compressor, 78 which produces a source of pressurized air in conduit 80. A gas compressor 82 produces a source of pressurized natural gas in conduit 84. Both air compressor 78 and gas compressor 82 are driven by variable frequency AC motor drives (not shown) and are electronically controlled to deliver the appropriate quantity of air and gas to the mixing chamber 86. Water is introduced into the combustion chamber, 88 through water inlet 92 as controlled by valve 98. A burner (not shown) is ignited and burns the air/gas mixture produced by the mixing chamber 86 and converts the water directly into steam as it flows through the combustion chamber 88. A temperature sensor 96 which is downstream from the combustion chamber 88 senses the temperature of exhaust steam in exhaust conduit 94 and is used by control 54 to control the speed of air compressor 76 and gas compressor 82 to thereby maintain a constant temperature of gas steam as it is produced by the vapor steam generator 42. The control 54 may also control the moisture content of the steam in exhaust conduit 94 by controlling the rate of water input into the combustion chamber assembly 88 through water inlet 92 by valve 98.

In accordance with the teachings of the present invention, the control 54 may be utilized in controlling the vapor steam generator 42 to a much greater extent and in a much different manner than was previously achieved in the prior art. As it is most desirable to produce finished pellets having a pre-determined moisture content, it is desirable to control the rate of input of dry material as well as the rate of input of moisture. Many of the prior patented developments of the inventor have been directed to solving this problem. With the vapor steam generator which has most recently been made commercially available and operationally suited for use in a pellet mill, a source of steam is available which is produced in a manner wherein the input of moisture can be monitored and controlled in a reasonably reliable manner. By reconfiguring the control mode for the vapor steam generator, the inventor has succeeded in eliminating the flow of moisture as a means for controlling the temperature or other operation of the steam generator, and instead utilizes the operation of the burner to control the temperature of the exhaust steam while maintaining a rate of flow of moisture as desired to suit the flow of dry material into the pellet mill. Thus, a control and method has been developed which utilizes the vapor steam generator in producing steam of a pre-selected temperature and pre-selected moisture content to correspond to a rate of flow of dry material. This can be readily maintained as the pellet mill operates as the steam temperature can be monitored and corrected as necessary through modulation of a fuel input.

In addition to directly proportioning the amount of moisture to the rate of flow of dry material, the various control modes utilized by the inventor as disclosed in his prior patents may also be utilized to determine the amount of moisture required in the pellet mill. Additionally, it is believed that smoother operation of the vapor steam generator for other purposes as well is achieved through the use of the control mode disclosed and claimed herein which controls the temperature of the exhaust steam through modulation of the air/gas mixture to the burner independently of the flow rate of moisture.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. An automatic control for a pellet mill, said pellet mill comprising a pellet producing means, means to input a desired rate of dry material, and a vapor steam generator having a heat source to convert water to steam and thereby produce steam, the output of said vapor steam generator being input to the pellet mill, the automatic control comprising means to determine a desired steam temperature and means responsive to the desired temperature determining means to modulate the heat source to thereby maintain the desired steam temperature.

2. The device of claim 1 wherein the automatic control further comprises means connected to the vapor steam generator to control the moisture content of the steam independently of the temperature thereof.

3. The device of claim 1 wherein the automatic control further comprises means connected to the vapor steam generator to maintain the moisture content of the steam at a constant value as the temperature is modulated.

4. The device of claim 1 wherein the automatic control further comprises means to sense the moisture content of the material in the pellet mill, and means connected to the vapor steam generator to adjust the moisture content of the steam in response thereto.

5. The device of claim 4 wherein the moisture sensing means comprises means to sense the moisture content of the material in the pellet producing means.

6. The device of claim 4 wherein the moisture sensing means comprises means to sense the temperature of the material before entering the pellet producing means and after exiting the pellet producing means.

7. The device of claim 4 wherein the pellet producing means further comprises a rotating die, and means to force the material through the die to form pellets, the moisture sensing means comprising means to sense the temperature of the material as it emerges from the die.

8. The device of claim 4 wherein the pellet mill further comprises a conditioner for mixing the steam and dry material and the moisture sensing means comprises means to sense the temperature of the material before entering the conditioner and after exiting the conditioner.

9. The device of claim 1 wherein the heat source comprises a burner which burns an air/gas mixture and wherein the modulating means comprises means to modulate the flow of air/gas to the burner.

10. The device of claim 9 further comprising means to sense the temperature of the steam as it exits the steam generator, the automatic control having means to modulate the heat source in response to said steam temperature sensing means to thereby maintain the desired steam temperature.

11. An automatic control for a pellet mill, said pellet mill comprising a pellet producing means, means to input a desired rate of dry material, and means to input a desired rate of steam from a vapor steam generator, said vapor steam generating having means to produce steam at a desired temperature and moisture content including a burner adapted to be surrounded by water, the automatic control having means connected to the input means to sense the flow rate of dry material, means connected to the vapor steam generator to sense the temperature of the steam, means connected to the vapor steam generator to determine a desired flow rate of moisture through the vapor steam generator, and means connected to the vapor steam generator to maintain a desired steam temperature by modulating the burner independently of the moisture flow rate.

12. The device of claim 11 wherein the control further comprises means connected to the vapor steam generator to module the flow of moisture through the vapor steam generator.

13. The device of claim 11 wherein the control has means connected to the input means and vapor steam generator to maintain the moisture flow rate and the dry material flow rate in a fixed proportional relationship as pellets are produced by the pellet mill to thereby produce pellets having a desired moisture content.

14. A method for controlling a vapor steam generator, the vapor steam generator having a burner adapted for direct contact with water, the steam from the vapor steam generator being input to a pellet mill, the pellet mill having a pellet producing means, and means to input a desired rate of dry material, the method comprising the steps of:
sensing the temperature of the exhaust steam,
determining a desired steam temperature in response to one or more parameters of the pellet mill,
modulating the flow of an air/gas mixture to the burner to maintain the temperature of the exhaust steam at a desired temperature,
independently modulating the flow of moisture through the vapor steam generator to satisfy a desired moisture content value for the exhaust steam,
determining a desired moisture flow rate as a proportion of the flow rate of the dry material, and
controlling the vapor steam generator to maintain the desired moisture flow rate.

* * * * *